Patented Feb. 23, 1937

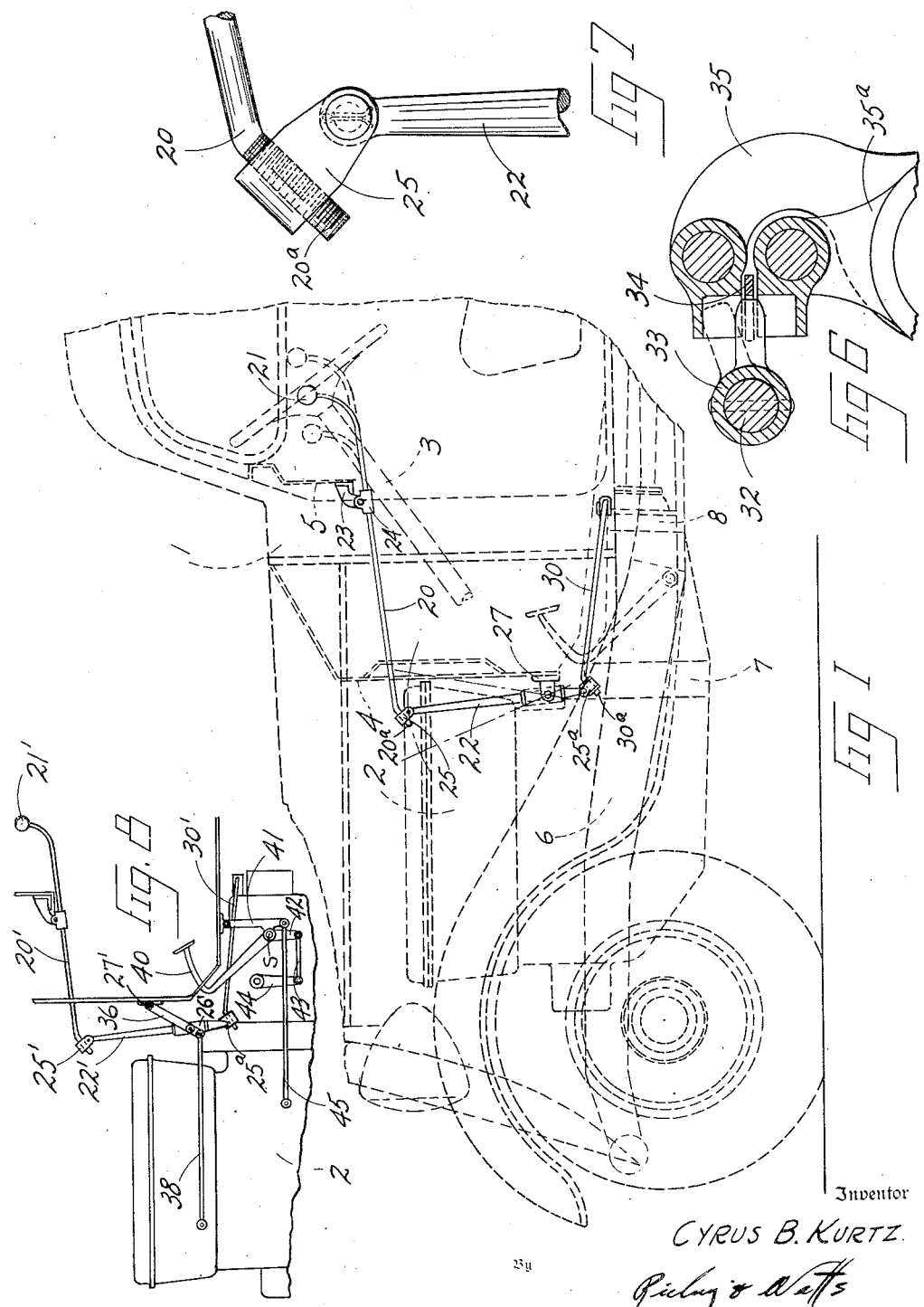

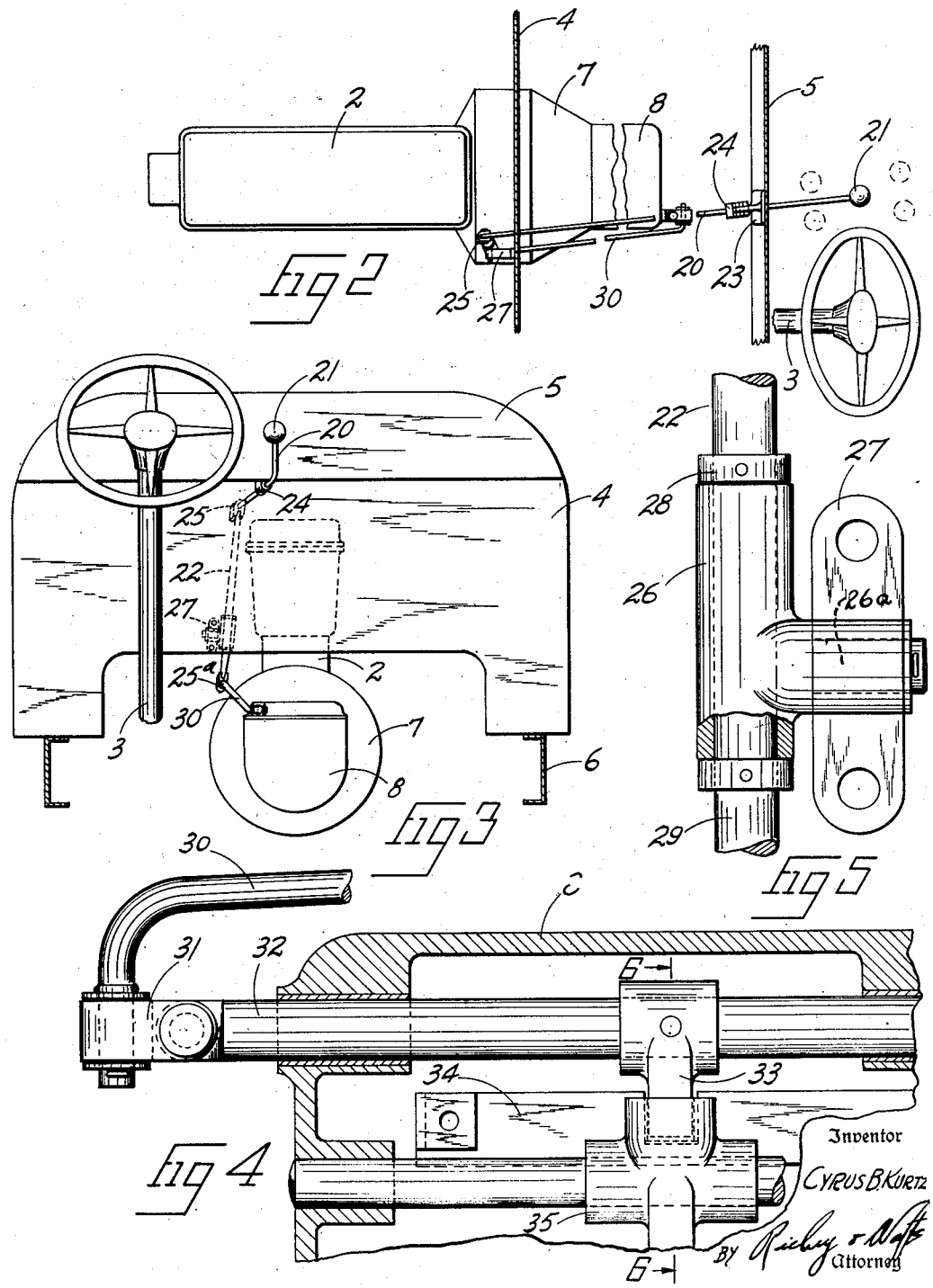

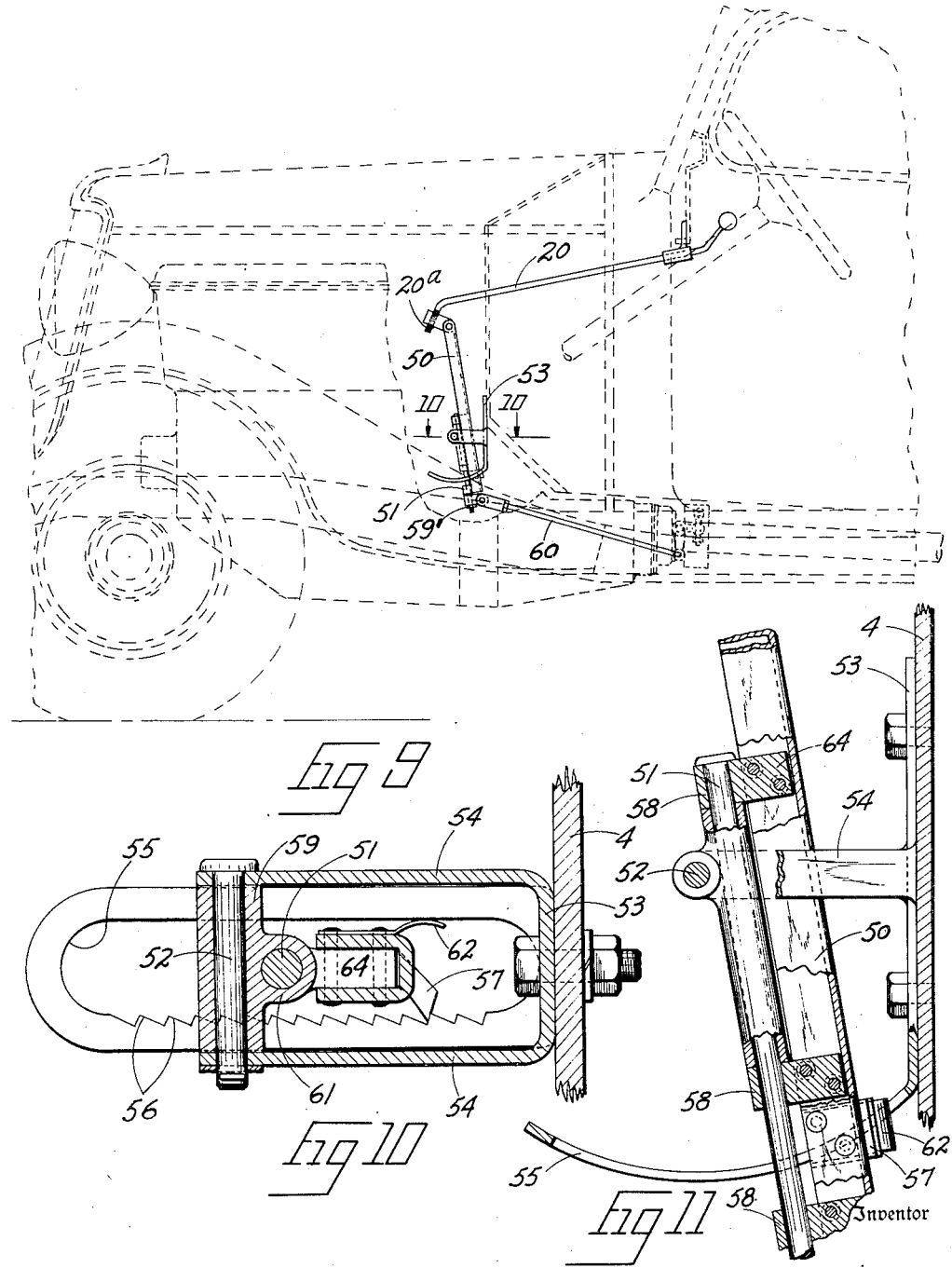

2,071,348

UNITED STATES PATENT OFFICE 2,071,348

CONTROL MECHANISM

Cyrus B. Kurtz, Cleveland, Ohio, assignor to Chas. Carter as trustee for himself, Cyrus B. Kurtz, and Cyrus B. Kurtz, Jr.

Application April 13, 1935, Serial No. 16,228

23 Claims. (Cl. 180—64)

This invention relates to control mechanism and is exemplified herein and more particularly described in an improved selective gear control mechanism especially adapted for use in a motor vehicle. A modified form also shows an adaptation to a brake control mechanism for a motor vehicle.

In the manufacture of motor vehicles it has become common practice to mount the motor in the vehicle frame on resilient supports to cushion the frame and motor with respect to each other to prevent the transmission of vibrations and torque reactions therebetween. It is also desirable and conventional to construct the motor and transmission mechanism as a unit and where such construction is combined with a resiliently mounted motor the transmission mechanism and motor oscillate and move in unison with respect to the frame.

The transmission mechanism is usually provided with an upstanding gear shift lever which projects upwardly from the transmission through the floor boards of the body of the vehicle and is arranged centrally of the vehicle operator's compartment. This gear shift lever which is in a position conveniently accessible to the operator is actuated by the operator longitudinally and laterally through what is known as an H-shift to select the desired gear ratio.

A transmission gear shift lever mounted as above described of necessity oscillates in unison with the transmission mechanism connected to the power unit and the lower end of the lever being mounted near the axis of oscillation of the power unit, the upper end of the gear shift lever has movements imparted thereto of considerable magnitude. This lever movement is obviously objectionable and dangerous.

The space occupied by the gear shift lever is desirable since the removal of the gear shift lever and the emergency brake lever, which is also usually arranged in this area, would permit three persons to comfortably occupy the front seat of the vehicle. Grease and dust invariably filter upwardly through the holes in the floor board around the conventional upright gear shift and emergency brake lever installation after the vehicle has been in service a short time.

Numerous attempts have been made through the medium of electro-magnetic actuators, Bowden wire units, cables and like structures to operate the gear selector from the vehicle dash or instrument panel or other point of attachment convenient to the operator. The measures heretofore taken to eliminate the upright gear shift and emergency brake installation and their attendant disadvantages have resulted in relatively complicated and expensive structures.

For the purpose of illustrating and describing my invention I will refer to it in the environment of a motor vehicle of the resiliently mounted motor type above described, but those skilled in the art will appreciate that the application of the principles of my control mechanism or the mechanism itself may well be adapted to rigidly mounted motors and to other and varied uses.

It is among the objects of my invention to provide a control mechanism for a motor vehicle adapted to be mounted in a position conveniently accessible to a motor vehicle operator which will transmit the actuating movements of the operator to an actuated brake or speed change mechanism arranged beneath the floor of the vehicle without traversing the area of the operator's compartment above said actuated mechanism and without extending through the floor of the vehicle.

A further object of the invention is to provide a control mechanism adapted to carry out the foregoing object which is operative to respond to the conventional H-shift speed change movements so as to obviate any material change in driving technique.

A further object of the invention is to provide a control mechanism which will compensate for the involuntary movements of the transmission mechanism with respect to the vehicle body and which will transmit and maintain all desired voluntary movements imparted to the mechanism by the operator.

A further object of the invention is to provide a speed change control mechanism having forwardly, downwardly and rearwardly arranged actuating members which will move the speed change mechanism in the same direction and with a force and speed proportional to that applied to the control mechanism.

A further object of the invention is to provide a control mechanism for a motor vehicle comprising an articulated control arranged to extend forwardly, downwardly and rearwardly with respect to the vehicle operator's compartment which will transmit to a speed change mechanism a rotary gear selecting motion and a longitudinal gear shifting motion imparted to the control by the operator.

A further object of the invention is to provide a control mechanism for a motor vehicle brake comprising an articulated assembly arranged to extend forwardly and downwardly with respect to the vehicle operator's compartment which will transmit a rotary latch controlling motion and a longitudinal shifting motion to actuate a brake mechanism.

Other objects of my invention are to provide a control mechanism for a speed change assembly or a brake system which is simple in construction, light in weight, compact in size, economical in manufacture and durable and dependable in operation. Another object is to provide control mechanism according to the preceding objects which can readily be adapted to various uses and types of installations.

Further objects and advantages of the invention will become apparent as the description proceeds, reference being made to the drawings wherein I have illustrated preferred forms of my invention, and in which:

Figure 1 is a view in side elevation of the forward position of a motor vehicle having a control mechanism embodying the features of the present invention operatively applied thereto.

Figure 2 is a fragmentary top plan view of the power unit and control mechanism of Figure 1.

Figure 3 is an elevation with vehicle parts in section of the mechanism looking forwardly toward the dash of the motor vehicle.

Figure 4 is an enlarged sectional view of a part of the transmission housing and gear selector unit.

Figure 5 is a detail view partly in section of a double pivotal mounting employed in the control mechanism.

Figure 6 is a section on line 6—6 of Figure 4.

Figure 7 is a detailed view illustrating a connection employed between adjacent actuating members of the control mechanism.

Figure 8 is a view similar to Figure 1 illustrating a modified control support especially adapted for movably mounted power units which are subjected to considerable longitudinal movement during operation.

Figure 9 is a view similar to Figure 1 illustrating a control mechanism constructed according to the precepts of my invention especially suited to actuate a brake assembly.

Figure 10 is an enlarged cross sectional view taken on line 10—10 of Figure 9.

Figure 11 is an enlarged side view with parts in section illustrating the pivotal mounting of the assembly employed to control the brake.

Referring to the drawings in detail the motor vehicle which may be of any desired type as indicated generally in dotted lines at 1, is provided with a frame 6 having a motor 2 movably mounted thereon so as to respond to torque reactions in the manner heretofore described. The motor vehicle body may be provided with the usual front part or dash 4, an instrument panel 5 and floor boards arranged above the clutch and transmission housings 7 and 8 respectively. The clutch and transmission housings being rigidly connected to the motor are in effect integral therewith so that motor movements will cause the transmission to move with respect to the vehicle body. The foregoing parts are conventional in modern motor car construction and form no essential part of the present invention except insofar as they enter into the general combination.

Since it is among the primary objects of this invention to free the vehicle operator's compartment of obstructing gear shift and brake levers, and since the transmission mechanism of the modern motor vehicle is arranged beneath the operator's compartment, the control mechanism which I have provided may be generally described as comprising an actuating member 20 extending forwardly, a member 22 operatively connected to and extending downwardly from the member 20 and a member 30 operatively connected to and extending rearwardly from the member 22 and engaging the speed change mechanism. The member 20 which is arranged in a position conveniently accessible to the operator and which may be hereafter referred to as the hand rod 10 preferably comprises a rod turned upwardly to provide a ball handle at one end and turned downwardly at the other end as at 20a to provide a portion connecting the member 20 to the downwardly extending member 22. That end of the hand rod 20 more nearly adjacent the operator is preferably supported to slide longitudinally axially and to rotate upon its axis in a depending sleeve 24 pivotally secured through the bracket 23 to the instrument panel 5 and the forward end of the hand rod is arranged to project through the vehicle dash 4. The portion 20a is preferably threaded as shown in Figure 7 to have a threaded engagement with an internally threaded clevis 25 pivoted at the upper end of the downwardly extending member 22.

To transmit the rotational and sliding movements of the hand rod 20 to the lower rearwardly extending member or shift rod 30 disposed beneath the floor boards, the lever member 22 is employed and is arranged to extend downwardly from the forward end of the hand rod 20 and is mounted to rotate upon its own longitudinal axis to transmit the rotation imparted thereto through the clevis 25 and is also mounted to turn about an axis transverse to its longitudinal axis to impart the fore and aft motion of the hand rod 20 to the shifting rod 30. The lever member 22 is preferably supported to turn about the said transverse axis more nearly adjacent its lower end in order to form a lever having substantially the same mechanical advantage with respect to the speed change mechanism as the conventional gear shift lever mounted directly on the transmission and extending through the floor of the vehicle. Although the member 22 is mounted to rotate about its own axis and is thus more than a lever, for the purposes of this description it may be hereafter referred to as a shifting lever.

To support the shifting lever 22 for rotation upon its own axis, preferably a sleeve 26 is positioned thereon between a pair of collars fixed to the lever and the sleeve in turn is pivoted through the medium of a suitable stub shaft 26a preferably formed integrally therewith to a bracket 27 on the vehicle dash 4. It will be understood as the description proceeds that the shifting lever 22 may, if desired, be extended downwardly beyond the point of its connection with the shifting rod 30 and mounted at said extended portion through means carried by the vehicle frame to rotate about longitudinal and transverse axis. It will also be understood that the lever 22 may be supported on a ball and socket or that a bracket similar to 27 be suspended by links between the motor and body as will be more fully described hereinafter. If the motor and body are relatively immovable, the bracket 27 may be mounted on the motor instead of the body if that be more convenient. Where the motor and body are relatively movable, mounting the bracket on the motor would transmit such movements to the hand rod in a manner which I prefer to eliminate.

The lower member or shifting rod 30 is connected at one end to a part 32 of the speed change mechanism and through movements imparted to the shifting rod 30 effects the speed changes therein. A clevis 25a (similar to the clevis 25 heretofore described) is pivoted to the lower end of the shifting lever 22 and is provided with an internally threaded bore to receive a bent threaded end portion 30a of the shifting rod 30. The connection between the shifting rod 30 and the shaft 32 of the speed change mechanism is effected by means of a pivoted internally threaded clevis 31 of the type identified as 25 and 25a, although it will be understood that other types of connections will function here since there is no bodily angular movement between rod 30 and shaft 32.

The clevis members 25 and 25a accomplish an important function in the control mechanism of my invention in that they transmit the rotational gear selecting movement of one member to the next adjacent member and may change the angular relation between the members to effect a gear shifting movement. This function may be understood by a reference to Figure 7 wherein it will be observed that a rotation of the member 20 upon its longitudinal axis will cause the bent end 20a to rotate in an arc about a point at the bend as an axis. As the portion 20a swings through the said arc the clevis 25 is constrained to swing through the arc therewith and through the pivot pin carried jointly by the clevis 25 and the shifting lever 22 will effect a rotation of shifting lever 22. The above rotational movement is effected without displacing the shifting lever 22 bodily with respect to the hand rod 20. The rotational movements of the adjacent parts are reversed in direction through the arrangement shown in Figure 7; that is, a clockwise rotation looking to the left (Figure 7) of hand rod 20 swings the bent end 20a through the arc in a counter-clockwise direction (looking down, Figure 7) and the clevis 25 through the rotatable thread bearing therein is carried in a counter-clockwise direction about the axis of the shifting lever 22 and through the transverse pin connection between bracket 25 and shifting rod 22 effects a counter-clockwise rotational movement of lever 22. The counter-clockwise movement of lever 22 (looking down) is transmitted through the pivoted clevis 25a and through the medium of the bent end portion 30a of the shifting rod 30 again reverses the rotation and thus the shifting rod 30 rotates in the same direction as hand rod 20.

The foregoing rotational movements may be transmitted through the members 20, 22 and 30 without displacing the members bodily with respect to each other or with respect to the supporting structure. The rotational movement of the members is transmitted to the shaft 32 of the speed change mechanism and therein is employed to rock the shaft 32 about its axis in order to select the desired gear ratio through the desired shifter yoke. The rocking of the shaft 32 within the speed change mechanism to select the desired gear is familiar to those skilled in the art and the movement of the ball handle on the hand rod 20 to effect speed change selection corresponds to the rocking of the conventional upright gear shift lever mounted directly on the transmission.

Referring again to Figure 1 it will be observed that a forward sliding movement of the hand rod 20 will through the pivotal connection at the forward end displace the lever 22 about its transverse axis in the stub shaft 26a. The angular movement of the shifting lever 22 about its transverse axis is transmitted through the clevis 25a to the shifting rod 30 and through the medium of the shaft 32 effects a gear shifting or speed changing movement within the transmission. Since the shifting lever 22 is proportioned to have the same mechanical advantage with respect to the speed change mechanism as the conventional gear shift lever, the speed and force of shifting movement of the hand rod 20 corresponds to the shifting movement of an upright gear shifting lever mounted directly on the transmission.

Among the advantages which flow from the arrangement of the rods and levers in my control mechanism is that lateral movements or oscillations of the speed change mechanism occasioned by torque and inertia reactions in the power unit are not transmitted from the speed change mechanism to the hand rod 20 which projects into the operator's compartment. Lateral bodily movements of the speed change mechanism will through the connection to rod 30 at 31 merely function to swing the rod about its forward end as a pivot and thus be ineffective to move the hand rod 20.

In the event that the power unit is mounted to have considerable longitudinal movement with respect to the frame and body, I have provided in Figure 8 a modified form of my invention which will accommodate longitudinal movement of the speed change mechanism with respect to the body of the vehicle. Since the actuating members of the control mechanism itself are not appreciably altered in structure or function in the modified form the corresponding members are referred to by like numerals provided with an exponent. In this form of my invention the shifting lever 22' is supported for rotation about its longitudinal axis and about a transverse axis through a sleeve 26' and links 36 and 38. The sleeve 26' is mounted substantially as sleeve 26 heretofore described and the stub shaft projecting therefrom is mounted for free rotation on the link 36 and the link 36 is projected below the stub shaft mounting to pivotally engage link 38 which extends forwardly to a point of attachment on the motor.

Preferably the link 36 and the lever 22' are proportioned with respect to each other on each side of their interpivoted connection so that a ratio between the link 36 and the lever 22' is maintained which will insure that motor movements will not cause any appreciable movement of the upper end of the lever 22'. To effect this compensating action the link and the lever are proportioned so that substantially the whole length of lever 22' is to the portion of the lever between 25a and the pivot in 26' as substantially the whole length of link 36 is to the portion of the link 36 between said pivot and the end thereof connected to link 38. By mounting the lever substantially in this manner a given longitudinal movement of the motor and transmission being transmitted directly to the lower end of the lever 22' will be transmitted in a proportionally smaller amount to the pivotal support for the lever 22' at 26'. By so proportioning the links and levers, the upper end of lever 22' will remain substantially stationary while the lower end of the lever is swung about the upper end as a center when there is fore and aft movement between the motor and the body of the vehicle. Fore and aft movement of the motor with respect to the body of the vehicle will swing the link 36 about its pivotal mounting on bracket 27' on the vehicle dash, and the swinging of the link 36 will swing the shifting lever 22' therewith about its point of pivotal attachment with the clevis 25'. The operation of the control mechanism is not adversely affected by the flexible mounting of the shifting lever 22' and in all other respects operates as heretofore decribed in connection with the preferred embodiment of Figure 1.

The hand rod 20 and the shifting rod 30 are arranged longitudinally of the vehicle and are not subjected to bending stresses and therefore may be formed of relatively light and resilient rod stock. An advantage flowing from the use of such rod stock is that a torque or twist may be given the members during the longitudinal or gearing shifting movement. The gear selector mechanism in the transmission will prevent rotation of the rods 20 and 30 until the member 33 carried by the gear selector shaft 32 is properly positioned to select a change speed gear in yoke 35 or 35a (Figure 6). Thus it will be observed that in carrying out the conventional H-shift the operator of the vehicle may through the hand rod 20 put a clockwise torque or twist therein while moving the lever forwardly from the low gear position and when the member 33 in the speed selector mechanism reaches the central slot in the plate 24, the entire assembly will be free to respond to the twist in the control mechanism and move through the slot in the plate 34 with a resilient snap action. The action above described permits a very rapid change from low speed gear to second speed gear and vice versa. Those familiar with the dangers attendant upon a dwell between gear changes will appreciate the value of the resiliently torsional gear selecting function of my control mechanism.

A compensating linkage arrangement for a clutch actuating assembly is also illustrated in Figure 8 wherein the clutch pedal 40 adapted for actuation by the operator of the vehicle is mounted to rotate upon a shaft S which is suspended from the body of the vehicle by a link 41. The pedal body is projected below the shaft mounting as at 42 and is connected thereat through link 43 to the clutch release lever 44. A link 45 is arranged to extend forwardly from the depending link 41 to a point of attachment on the power unit. The link support for the clutch pedal is constructed and arranged to function in a manner similar to the compensating link arrangement employed to support the speed change control. The link 41 and the pedal 40 are proportioned to extend beyond ther interpivoted connection so that longitudinal movement of the motor will through the link 45 transmit a proportionately smaller amount of movement to the pivot S. Fore and aft motion of the power unit will through link 45 swing the link 41 about its pivotal connection with the vehicle body, but will be ineffective to effect any rotation of the pedal 40 about the axis of shaft S, because of the compensatory movement transmitted through the link 43.

The control mechanism described in the foregoing paragraphs as relating to speed change control and actuation is suited for the control and operation of a manually operated brake. I have illustrated in Figure 9 a modification of the control mechanism wherein the hand rod 20, which is supported by the instrument panel and dash, extends forwardly through the dash to engage the upper end of a brake actuating lever 50. The hand rod 20 is provided with the bent end 20a and is connected to the lever 50 as in the speed change control assembly. The lever 50 is preferably mounted to turn about an axis parallel to its own longitudinal axis on a bearing pin 51 and is also mounted to rotate about an axis transverse to its longitudinal axis on bearing pin 52. A bracket 53 is mounted in the forward side of the dash 4 and supports therein between spaced ear portions 54 the transverse bearing pin 52. The lower end of the lever 50 is arranged to project downwardly through a slot 55 which is formed in a bent extension of the bracket 53. Said slot is provided along one edge with serrations or teeth 56 to cooperate with a dog 57 carried by or formed integrally with the lower end of the lever. The bearing pin 51 which is mounted in spaced sleeves 58 on the forward edge of the lever 50 projects below the lower end of the lever 50 and is pivotally connected through a swivel block 59' to the forward end of a brake rod 60. To support the lever 50 in bracket 53 for movement about its transverse axis a short sleeve 59 is integrally formed with a transverse long bearing sleeve 61 and receives therein a bearing pin 52 which is carried by the ears 54 of the supporting bracket. The lever 50 is normally urged to turn about the longitudinal axis of pin 51 and bring the dog 57 into engagement with the teeth 56 by a flat leaf spring 62 which is secured to that side of the lever remote from the teeth 56.

To effect brake actuation the hand rod 20 may be moved toward the operator with substantially the same force and movement that is applied to the conventional hand brake. The lever 50 will respond through the pivotal connection with the hand rod 20 to swing about its transverse axis and the reaction through the inclined faces of the teeth 56, and the dog 57 turn the lever about its longitudinal axis to effect a compression of the spring 62. The brake rod 60 may be moved forwardly with the lower end of the lever 50 and effects brake actuation in the usual manner. Upon conclusion of the brake actuating movement the spring 62 is effective to urge the dog 57 into engagement with the teeth 56 and maintain the position of the brakes. To release the brake the hand rod 30 may be rotated by the operator in the manner heretofore described in connection with the gear shift control, and such rotation will cause the brake lever to turn slightly about the longitudinal axis of pin 51 and withdraw the dog 57 from the teeth 56, and the forward movement of the hand rod 20 while the lever 50 is so tilted will release the brake.

The lever 50 may economically be formed as a channel U-shaped in cross section as best illustrated in Figure 10. This construction facilitates the mounting of the longitudinal and transverse bearings 59—61 and the sleeves 58 by the reception in the open side of the U of a tongue portion 64 integrally formed with the sleeve 58. The U-shaped construction of the lever 50 also facilitates the rigid mounting of the dog 57 wherein a part of the bight portion of the U is cut away to receive an angular portion of the dog 57. Rivets or analogous means employed to hold the dog 57 in position may also be utilized to mount the spring 62 as illustrated in Figure 10.

In connection with the brake control arrangement above described, it is pointed out that the bracket 53 which supports the lever 50 may be mounted adjacent the right side of the vehicle and thus the corresponding area at the left side will be available for the mounting of the control mechanism for the speed change and this arrangement permits complete elimination of upwardly projecting levers from the floor boards and will bring about a full appreciation of the advantages of the control mechanism of my invention.

Although preferred embodiments of the invention have been described in considerable detail those skilled in the art will appreciate that various modifications and adaptations of my invention to other uses can be made without departing from the spirit and scope thereof. It is, therefore, to be understood that my invention is not limited to the specific disclosures herein or in any manner other than by the appended claims when given the range of equivalents to which my patent may be entitled.

I claim:—

1. In a motor vehicle having a change speed transmission, a transmission gear shifting mechanism comprising a pair of rods extending generally longitudinally of the vehicle, one of said rods being longitudinally and rotatably movable and having an operative and gear selective connection with said transmission at one end, the other rod being spaced from said first named rod and manually movable both longitudinally and rotationally, a lever arranged between said rods, said lever mounted for rotational movement about its longitudinal axis and pivoted about an axis transverse to said longitudinal axis, and means operatively connecting said rods to said lever for transmitting rotational movement from one rod to the other through said lever and for transmitting longitudinal movement of said rods through said lever.

2. In combination, a motor vehicle having a frame, a power unit and body thereon, a speed change transmission carried by said power unit, a shaft on said transmission responsive to longitudinal axial shifting movement and axial rotary movement to effect speed changes, a control mechanism extending from said shaft terminating in the forward part of the vehicle body comprising an axially rotatable and longitudinally shiftable member extending forwardly from said transmission and operatively connected at its forward end to an upwardly extending lever, said lever mounted for rotation about its longitudinal axis and pivoted for movement about an axis transverse to said longitudinal axis, and a manually operated axially rotatable and longitudinally shiftable member operatively connected to the upper end of said lever to impart gear selecting and gear shifting movements to said speed change mechanism.

3. In a control mechanism, a lever mounted to turn about axes substantially normal to each other, a manually operated member and an actuated member, said members operatively connected to said lever adjacent the upper and lower ends thereof respectively, said members mounted for axial rotation and longitudinal movement, said operative connections through the rotation of said lever about one axis transmitting rotation from one member to the other and through rotation of said lever about the other axis transmitting longitudinal movement from one member to the other.

4. In a control mechanism, a lever mounted to rotate about a longitudinal axis and about an axis transverse to said first named axis, an actuating member operatively connected at one end of said lever and projecting laterally therefrom, an actuated member connected at the other end of said lever and projecting laterally thereof in substantially the same direction as said actuating member, said two members and said lever connected for simultaneous rotation about their own longitudinal axes, said two members mounted for longitudinal axial movement to move with said lever in response to lever rotation upon said transverse axis.

5. In combination, a motor vehicle having a frame and body, a power unit therein mounted for movement with respect to said frame and body, a transmission connected to and movable with said power unit, a control mechanism for said transmission comprising a lever mounted forwardly of said body to turn about axes substantially normal to each other, a manually operated member and an actuated member, said members operatively connected to said lever adjacent the upper and lower ends thereof respectively, said manually operated member extending rearwardly from the lever into said vehicle body, said actuated member extending rearwardly from said lever and beneath said body to engage said transmission, said members mounted for axial rotation and longitudinal axial movement, said operative connections through rotation of said lever about one axis transmitting rotation from said manually operated member to said actuated member and through rotation of said lever about the other axis transmitting longitudinal axial movement from one member to the other to effect gear selecting and gear shifting movements.

6. In combination, a motor vehicle having a frame and body, a power unit therein mounted for movement with respect to said frame and body, a transmission connected to and movable with said power unit, a control mechanism for said transmission comprising a pair of vertically spaced members arranged to extend longitudinally of said vehicle, said upper member mounted for rotation and longitudinal axial shifting adjacent the vehicle operator's position and said lower member connected to said transmission at one end and extending forwardly therefrom to a point substantially below the forward end of said upper member, and means operatively connecting the forward ends of said two members to transmit the axial rotation and longitudinally axial shifting of said upper member to said lower member comprising a lever mounted for rotation about axes transversely arranged with respect to each other, said means jointly supported by said power unit and said vehicle body by links arranged to compensate for movement of the power unit with respect to the vehicle body.

7. In combination, a motor vehicle having a frame and body, an actuated means mounted externally of said vehicle body, a control mechanism for said actuated means comprising a manually operated member rotatably and slidably mounted adjacent the instrument panel of said vehicle body and extending forwardly therefrom and terminating in a laterally bent end portion, a lever extending downwardly from said bent end portion pivotally supported to turn upon a longitudinal axis and about an axis transverse to said longitudinal axis, means connecting the lower end of said lever and said actuated means, means operatively connecting said lever and said member comprising a clevis pivoted to said lever, extending laterally therefrom and pivoted to said bent end portion of said member to turn said lever upon its longitudinal axis in response to 8. In combination, a motor vehicle having a frame and body, an actuated brake means mounted beneath said body, a control means for said brake comprising a manually operated member mounted adjacent the instrument panel of said body for longitudinal brake actuating movement and axial rotational brake securing movement, a lever arranged beneath the forward end of said manually operated member, said lever mounted to rotate about an axis extending longitudinally of the lever to effect a brake securing movement and mounted about an axis transverse to said longitudinal axis to effect a brake actuating movement and means operatively connecting the forward end of said member to said lever to transmit the movements of the manually operated member to said lever.

9. In combination, a motor vehicle having a frame and body, an actuated brake means mounted beneath said body, a control means for said brake comprising a manually operated member mounted adjacent the instrument panel of said body for longitudinal brake actuating movement and axial rotational brake securing movement, a lever arranged beneath the forward end of said manually operated member, said lever mounted to rotate on an axis extending longitudinally of said lever and pivoted to rotate about an axis substantially normal to said longitudinal axis, said lever provided with a dog adjacent its lower end and a series of teeth arranged adjacent said dog upon a member fixed with respect to the lever, means operatively connecting the upper end of said lever to said manually operated member to turn said lever about the longitudinal axis in response to rotation of said member upon its longitudinal axis to move said dog into and out of engagement with said series of teeth and to rotate said lever about said normal axis in response to longitudinal shifting of said manually operated member to effect actuation of said brake means.

10. In combination, a motor vehicle having a frame and body, a power unit therein mounted for movement relative to said frame and body, a rotatable shaft connected to and movable with said power unit, a control means for said rotatable shaft comprising a manually operated member projecting upwardly at the forward portion of said vehicle body, means to support said member for rotation upon an axis transverse to said member comprising a link pivoted to said vehicle body and depending therefrom, a second link pivoted to said first link and extending longitudinally therefrom and pivoted to said power unit, a link connected to said manually operated member below its pivot support on said means and pivotally connected to said rotatable shaft.

11. In a motor vehicle, a body, a motor mounted to move longitudinally and oscillate upon an axis with respect to said body, means mounted on said motor to be controlled and actuated from said body, a manually swingable lever arranged to be actuated from within said body, a link pivoted to said body and pivotally supporting said lever, a link arranged generally parallel with the axis of motor oscillation connected to said lever supporting link and said motor, and a link arranged generally parallel with said last named link connecting said lever to said means to actuate said means in response to lever movement.

12. In a motor vehicle, a body and a power unit mounted to move longitudinally and oscillate upon an axis with respect to said body, means mounted on said motor to be controlled and actuated from said body, a manually swingable lever arranged to be actuated from within said body, a link pivoted to said body and pivotally supporting said lever, a link arranged generally parallel with the axis of motor oscillation connected to said lever supporting link and said motor, said lever and lever supporting link proportioned to extend beyond their interpivoted connection at the point of lever support to move said connection relative to the body in response to motor movements, and a link arranged generally parallel with said last named link connecting said lever to said means to actuate said means in response to lever movement.

13. In a motor vehicle, a body and a power unit mounted to move with respect to the body, a transmission control mechanism jointly supported on said body and movable power unit by a linkage system arranged to compensate for power unit movements, said system comprising a link pivoted to the forward part of said body and depending therefrom, a lever on said control mechanism pivoted to said link intermediate the ends of the link and intermediate the ends of the lever, a link pivotally connected to the extremity of said first link and extending forwardly therefrom and pivoted to said power unit to move said link and lever in response to movements of the power unit.

14. In a control mechanism, the combination with supporting means, of a lever element to be swung and given rotational movement, said lever element being pivotally supported on said supporting means for swinging movement and being rotatably supported for movement about an axis transverse to said pivotal support, a rod element extending at an angle to said lever element and connected with one end thereof, and supported by said supporting means for rotational movement about its own axis and bodily movement substantially in the plane of swinging movement of said lever, one of said elements adjacent its connection with the other thereof having an end portion inclined to its own axis, and means connecting said elements pivotally engaging the inclined end portion of one of them for pivotal movement about the axis of said inclined portion, and pivotally connected with the other of said elements about an axis transverse to the axis thereof.

15. In a control mechanism, the combination with a vehicle body, of a lever element to be swung and given rotational movement, said lever element being pivotally supported on said body for swinging movement and being rotatably supported for movement about an axis transverse to said pivotal support, a rod element extending at an angle to said lever element and connected with one end thereof, said rod supported by said body for rotational movement about its own axis and bodily movement substantially in the plane of swinging movement of said lever, one of said elements adjacent its connection with the other thereof having an end portion inclined to its own axis, and means connecting said elements pivotally engaging the inclined end portion of one of them for pivotal movement about the axis of said inclined portion, and pivotally connected with the other of said elements about an axis transverse to the axis thereof.

16. In a control mechanism, the combination with a motor vehicle having a unit movable with respect to the frame and body, of a lever element to be swung and given rotational movement, said lever element being pivotally supported at least in part by said unit for swinging movement and being rotatably supported for movement about an axis transverse to said pivotal support, a rod element extending at an angle to said lever element and connected with one end thereof, said rod supported by said body for rotational movement about its own axis and bodily movement substantially in the plane of swinging movement of said lever, one of said elements adjacent its connection with the other thereof having an end portion inclined to its own axis, and means connecting said elements pivotally engaging the inclined end portion of one of them for pivotal movement about the axis of said inclined portion, and pivotally connected with the other of said elements about an axis transverse to the axis thereof.

17. In a motor vehicle having a frame and body, a speed change device mounted in said frame and bodily movable with respect to said frame and body, a control mechanism for said speed change device extending therefrom to the body of the vehicle to a position conveniently accessible to the operator, said control mechanism including means to transmit the voluntary speed change movements of the operator to the speed change device and prevent the transmission through said control means of the involuntary movements of said speed change device, comprising a rod connected at one end to said speed change device and extending forwardly therefrom generally longitudinally of the vehicle, a lever mounted for movement upon axes transversely arranged with respect to each other, said lever supported by said body adjacent the forward end of said rod, said rod pivotally connected to said lever at said forward end and being free of support or connections intermediate its ends to swing freely on said pivotal connection in response to involuntary movements of said speed change device with respect to said frame and body, and an actuating rod connected to said lever and extending rearwardly therefrom into the operator's compartment of the vehicle.

18. In a motor vehicle having a frame and a motor, a speed change device mounted in said frame, bodily movable with respect to the frame, a control mechanism for said speed change device extending therefrom into the body of the vehicle to a position conveniently accessible to the operator, said control mechanism including means to transmit the voluntary speed change movements of the operator to the speed change device and prevent the transmission through said control means of the involuntary movements of said speed change device, comprising a rod connected at one end to said speed change device and extending forwardly therefrom generally longitudinally of the vehicle, a lever mounted for movement upon axes transversely arranged with respect to each other, said lever being supported at least in part by said motor adjacent the forward end of said rod, said rod pivotally connected to said lever at said forward end and being free of support or connections intermediate its ends to swing freely on said pivotal connections in response to involuntary movements of said speed change device with respect to said frame, and an actuating rod connected to said lever and extending rearwardly therefrom into the operator's compartment of the vehicle.

19. In combination, a motor vehicle having a frame and body assembly, a power unit therein mounted for movement with respect to said assembly, a transmission connected to and movable with said power unit, a control mechanism for said transmission comprising a pair of vertically spaced members arranged to extend longitudinally of said vehicle, said upper member mounted for rotation and longitudinal axial shifting adjacent the vehicle operator's position and said lower member connected to said transmission at one end and extending forwardly therefrom to a point substantially below the forward end of said upper member, and means operatively connecting the forward ends of said two members to transmit the axial rotation and longitudinal axial shifting movement of said upper member to said lower member, comprising a lever mounted for rotation about axes transversely arranged with respect to each other, said means jointly supported by said power unit and said assembly by links arranged to compensate for movement of the power unit with respect to said assembly.

20. In a motor vehicle, a frame and body assembly, a power unit mounted to move with respect to said assembly, a transmission mounted on said power unit arranged to be controlled and actuated from within said vehicle body, a manually swingable lever arranged to be actuated from within said body, a link pivoted to said assembly at one end and pivotally connected to said lever, a second link connected at one end thereof to the motor and pivotally connected to said first named link at the other end thereof, said lever and said links proportioned with respect to their inter-pivoted connections to move said lever relative to said assembly in response to motor movements, and a third link connected to said lever at one end and to said transmission at the other end to actuate said transmission in response to lever movement relative thereto.

21. In a control mechanism, a lever member mounted to rotate upon axes transverse with respect to each other, a rod member mounted to rotate upon its own longitudinal axis and to move longitudinally in the direction of its axis, means to connect said members to translate the longitudinal and rotary movement of said rod member into rotation of said lever member upon its axes, comprising a connector pivoted to one of said members upon an axis transverse to the longitudinal axis of said member, said connector provided with a bearing extending transversely of said pivotal connection with said one member, the end portion of the other of said members bent at an angle with respect to the longitudinal axis thereof and extending through said bearing and means to secure said bent end portion within said bearing.

22. In a control mechanism, a lever member mounted to rotate upon axes transverse with respect to each other, a rod member mounted to rotate upon its own longitudinal axis and to move longitudinally in the direction of its axis, means to connect said members to translate the longitudinal and rotary movement of said rod into rotation of said lever upon its axes, comprising a connector device pivoted to one of said members upon an axis transverse to the longitudinal axis thereof, said device provided with an internally threaded bore, the axis of said bore being transverse to the pivotal axis between said device and said one member, the end portion of said other member bent at an angle with respect to the longitudinal axis thereof, said bent end portion provided with external threads and arranged within said bore whereby rotation of said other member upon its axis simultaneously rotates said bent end portion within said bore and swings said one member to effect a rotation of said lever about one of its axes and longitudinal movement of said rod moves said lever about its other axis.

23. In combination, a motor vehicle having a frame and body assembly, a power unit therein mounted for movement with respect to said assembly, a transmission connected to and movable with said power unit, a control mechanism for said transmission comprising a pair of vertically spaced members arranged to extend longitudinally of said vehicle, said upper member mounted for rotation and longitudinal axial shifting and said lower member connected to said transmission at one end and extending forwardly therefrom to a point substantially below the forward end of said upper member, means operatively connecting the forward ends of said two members to transmit the axial rotation and the longitudinal shifting of said upper member to said lower member comprising a lever mounted for rotation about axes transversely arranged with respect to each other, said lever and said members connected to each other at substantially right angles by means including a bent end portion on one pivotally connected to a block pivoted on the other.

CYRUS B. KURTZ.